MAGNETIC RECORDING SYSTEM

Filed Sept. 30, 1964 2 Sheets-Sheet 1

Norikazu Sawazaki
INVENTOR.

BY George B. Oujevolk
Attorney

Jan. 10, 1967 NORIKAZU SAWAZAKI 3,297,268

MAGNETIC RECORDING SYSTEM

Filed Sept. 30, 1964 2 Sheets-Sheet 2

United States Patent Office 3,297,268

Patented Jan. 10, 1967

3,297,268

MAGNETIC RECORDING SYSTEM

Norikazu Sawazaki, Kohoku-ku, Yokohama-shi, Japan, assignor to Tokyo Shibaura Electric Co., Ltd., Kawasaki-shi, Japan, a corporation of Japan

Filed Sept. 30, 1964, Ser. No. 400,405
Claims priority, application Japan, Sept. 30, 1963, 38/52,968
2 Claims. (Cl. 242—55.14)

This invention relates to a magnetic recording system used over a long period of time for video signals requiring wide band width and containing high frequency components, such as television signals.

When recording information signals on magnetic recording medium, there is a limit in the permissible quantity of the information stored per unit area of the recording medium. Recording of such wide band signals as television signals and the like is usually made by increasing the relative speed of the recording medium with respect to a magnetic head which comprises the ordinary recording means. The recording time will be decreased accordingly. Accordingly, in a conventional magnetic recording system for video signals, a wide tape which is wound on a reel for storage is utilized as the magnetic recording medium and the surface of the tape is scanned by a magnetic head by advancing the tape in one direction while moving the head in a direction perpendicular or oblique to the direction of movement of the tape. For example, the recording tape is wound around a rotating cylinder while a magnetic head supported by a rotating disc is arranged to rotate around the cylinder.

In such an arrangement it is necessary to provide not only means to move or drive the tape but also a mechanism to rotate the head. The tape driving means becomes particularly complex construction and bulky because it is necessary to move the tape which is wound around a cylinder, as above described. In addition, it is also necessary to provide a so-called tracking automatic control device or means to cause a head to correctly scan over recording tracks on the tape.

As a result, with such a conventional magnetic recording system for video signals it has been difficult to obtain a magnetic recording device which is simple in construction and having small size so that it can be widely used in homes and the like.

It is, therefore, an object of this invention to provide an improved magnetic recording system which can easily record video signals over a long time.

Further objects of this invention is to provide a novel video signal recording device which is simple in construction and is of small size.

Still further object of this invention is to provide a handy magnetic recording device which is easy to manipulate and can widely be used in homes and the like.

The features of the invention which are believed to be novel are set forth with particularity in the appended claims. The invention itself, however, as to its organization together with further objects and advantages thereof, may best be understood by reference to the following description taken in connection with the accompanying drawings in which:

Figure 1:
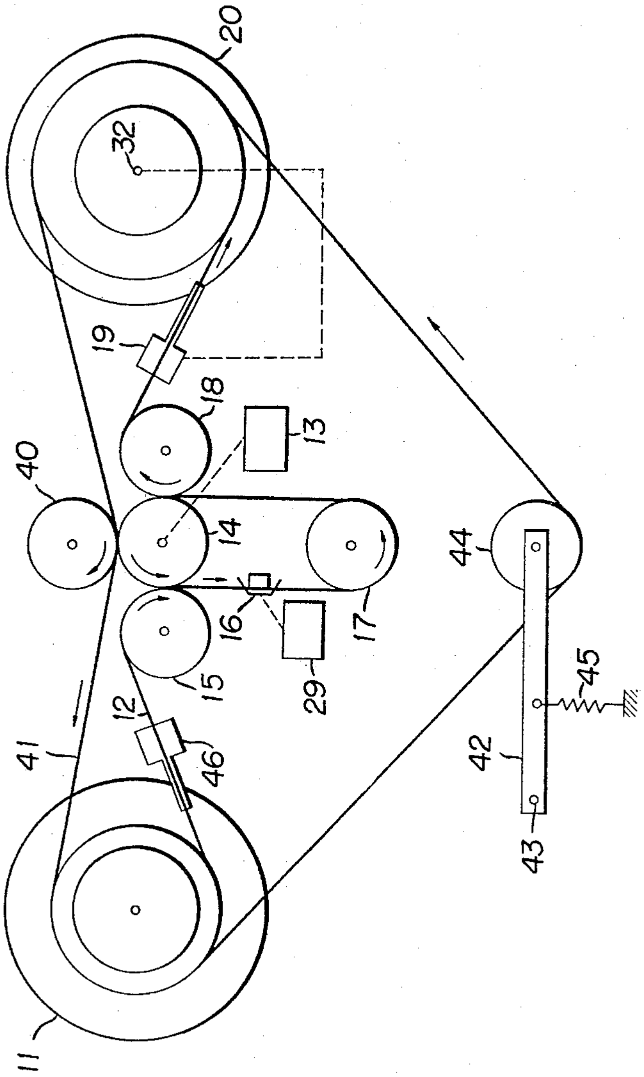
FIG. 1 is a diagrammatic plan view of one embodiment of this invention.

Referring now to FIG. 1 a magnetic tape 12 wound upon a supply reel 11 is payed out under tension by means of a capstan 14 driven by an electric motor 13 and a pinch roller 15 cooperating with the capstan 14. After passing through a magnetic head 16 connected to a video amplifier 29 and around a guide roller 17, the tape is pulled by the capstan 14 and another pinch roller 18 cooperating therewith and is finally wound upon a take up reel 20 through a winding guide 19.

Figure 2:
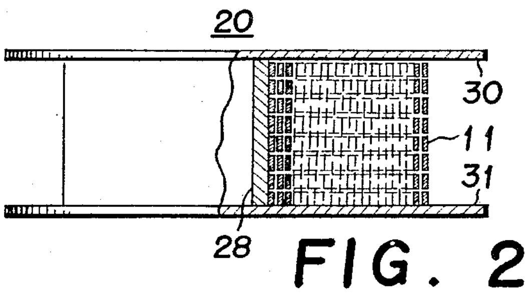
FIG. 2 is a side view, partly in section, of a take up reel to illustrate the lamina of a magnetic tape wound upon the reel.

In contrast to a relatively wide magnetic tape, say about 50 mm. wide, heretofore utilized to record ordinary video signals, in accordance with this invention very narrow tapes are utilized. Thus, tapes having a width of about 1/100 of that the conventional tapes, or tapes of a width of about 0.3 to 0.6 mm. are used. For example, it is advantageous to use tapes, 0.6 mm. wide and 15,000 m. long, are utilized. With such tapes, the width (inside dimension between reel frames) of the supply and take up reels may be about 12 mm., for example, and the diameter of the reels may be about 30 cm. In order to accommodate the maximum number of turns of the tape, the tape 11 is spirally wound on the reel 20 to form the first layer, the second layer is wound on the first layer and so on, as shown in FIG. 2. When using a reel having a width of 12 mm., a tape of a width of 0.6 mm. may be wound in one layer with about 22 to 24 turns.

Figure 3:
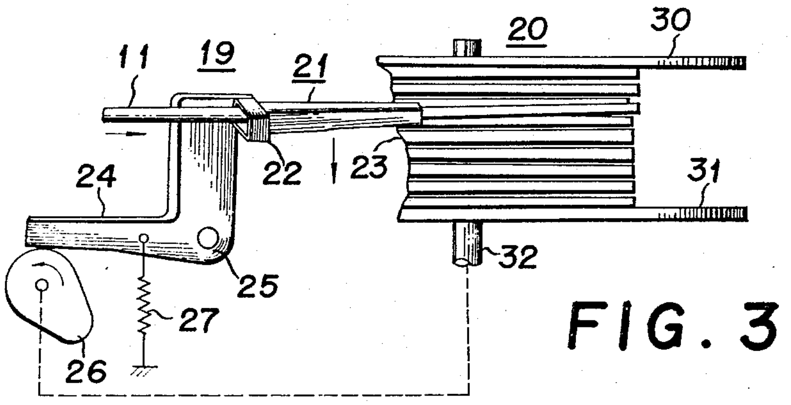
FIG. 3 is a diagrammatic side view, partly broken away, of the winding guide mechanism.

FIG. 3 schematically illustrates a side view of a guide mechanism for the tape which enables to wind in lamina the magnetic tape 12 around the take up reel, in a manner as shown in FIG. 3. More particularly, after passing through the capstan 14, the tape 12 is passed through a cylindrical guide member 21 as determined by its direction of running, and is then wound upon a core 28 of the take up reel 20. The inlet end 22 of the guide member is secured to the outer end of a letter L-shaped lever 24 to be moved in accordance with the pivotal motion of the lever so that the tape outlet portion 23 of the guide member is swung between opposing reel frames 30 and 31. The elbow of the letter L-shaped lever is pivoted by a pin 25 and the end opposite to the end to which is secured the guide member 21 is biased by a spring to always ride upon a rotating cam 26 which is connected to a shaft 32 of the take up reel 20 to be driven synchronously therewith at a constant speed. Thus, the cam is rotated slowly as the reel rotates. If, for example, it is designed that each layer of the tape on the take up reel is constituted by 22 turns, the cam would be designed such that it will make one half turn after 22 revolutions of the reel. During one half revolution of the cam 26, the guide member 21 will be moved from one reel frame 30 to the other 31 while during the next one half revolution will be moved oppositely from the reel frame 31 to the other 30. Thus, due to the reciprocating motion of the guide member 21, the tape will be guided to complete one layer between reel frames at each predetermined number of revolutions of the take up reel, and the layers are gradually built up to store the magnetic tape in the take up reel.

Figure 4:
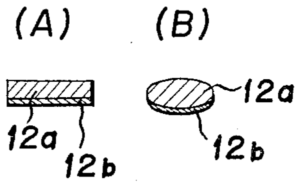
FIG. 4 is a view showing a cross sectional configuration of the magnetic tape used in accordance with this invention.

As shown in the cross sectional views shown in FIGS. 4A and 4B, the magnetic tape may comprise an organic flexible film base **12*a* having rectangular or elliptical cross section and a recording layer 12*b* of a magnetizable substance applied on the base. This is because that where magnetic tapes having very small width and thickness are to be utilized as in this invention, it is difficult to move smoothly the tapes without breakage or undesirable elongation and contraction. In order to eliminate these disadvantages, in the embodiment illustrated in FIG. 1, an endless driving tape or belt 41 is provided to partly surround coils of the tape 12 on the supply and take up reels 11 and 20, and to be urged against the tape driving capstan 14 by means of a pinch roller 40. The driving tape 41 may be formed of such flexible film as Mylar or polyethyleneterephthalate or the like and may be made to have a width corresponding to the width of the reels and a sufficient thickness not to impair flexibility so that the mechanical strength thereof can be made very large. Moreover, the driving tape would not impart any tension to the magnetic tape 12 itself, since the former tape closely encircles the peripheries of the magnetic tape coils wound on the supply and take up reels and moreover since the driving tape is driven at the same speed as the magnetic tape 12, thus enabling both reels to be rotated at proper speeds corresponding to the number of turns of the magnetic tape carried thereon. Thus, utilization of the driving tape 41 reenforces mechanically weak magnetic tape 12 enough to satisfactorily record magnetically at very high speed the video signals. As shown in FIG. 1, the driving tape 41 is given a constant tension by an idler roller 44 supported by a lever 42 pivoted at the opposite end 43 and mechanically biased by a spring 45**.

Figure 5:
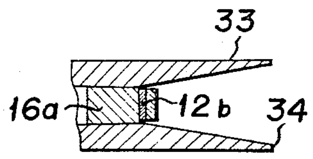
FIGS. 5 and 6 show sectional views of a portion of the magnetic head constructed in accordance with the principle of this invention.
Figure 6:
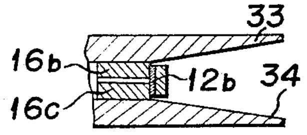

As has been already pointed out, since the width of the magnetic tape 12 is very narrow, the width of the magnetic head should also be very narrow. Accordingly, as shown in FIG. 5, it is preferable to provide tape guides 33 and 34 on both sides of the magnetic head 16 in order to cause it to accurately scan the recording tracks of the magnetic tape when it is driven at high speeds. More particularly, a head pole piece **16*a* is fixed in position by being located at the base of a pair of diverging tape guides 33 and 34, as shown in FIG. 5. While the pole piece 16*a* shown in FIG. 5 is of the single track recording type adapted to engage the whole width of the recording layer 12*b* of the magnetic tape, it may be made as the double track recording type as shown in FIG. 6. Thus the recording head may comprise two pole pieces 16*b* and 16*c* each adapted to engage respective one half of the width of the recording layer 12*b*** of the magnetic tape whereby to provide two recording tracks on a single magnetic tape.

One of the two recording tracks may be utilized to record video signals while the other voice signals. Thus, by alternately utilizing these tracks in go and return strokes it is able to double the apparent length of the magnetic tape. In such a case, however, it is necessary to add a suitable means to reverse the rotation of the capstan to reverse the direction of running of the magnetic tape 12. It is also necessary to provide a mechanism 46 similar to said tape guide mechanism 19 adjacent to the supply reel 11.

Thus, as can be easily understood from the foregoing description regarding a preferred embodiment, this invention makes it possible to accommodate in a small reel a magnetic tape of the length sufficient to record video signals over a long time by utilizing a narrow magnetic tape and by winding it on a reel as a thread winding device. Thus, for example, when a magnetic tape, 0.6 mm. wide and 15,000 m. long is utilized and travelled at a speed of 6 meters per second by capstan drive, it is able to continuously record over one hour and 20 minutes with the double track recording system. While the magnetic tape is driven at a high speed breakage or elongation of the magnetic tape can be positively prevented by the use of the driving tape. Further as the magnetic head is stationary, its construction is much simpler than the conventional rotary magnetic head. Thus, the magnetic recording mechanism embodying this invention is very simple in construction, of small size, inexpensive and easy to manipulate so that wide use in homes and the like can be expected.

While the invention has been explained by describing particular embodiments thereof, it will be apparent that improvements and modifications may be made without departing from the scope of the invention as defined in the appended claims.

What is claimed is:

1. A magnetic recording system for video signals comprising a fine magnetic recording tape, a capstan and two pinch rollers which cooperate to clamp said magnetic recording tape to advance it in a definite direction, a stationary magnetic head positioned close to said magnetic recording tape located between said two pinch rollers to record thereon video signals, a first reel supporting a coil of said magnetic recording tape to supply it to said magnetic head, a second reel to take up and store said magnetic recording tape after it has passed through said magnetic head, and an endless driving tape passing around the coils of said magnetic recording tape formed on said first and second reels, said endless driving tape being driven by said capstan at the same speed as said magnetic recording tape so as to control the revolution of both of said reels, said capstan and said pinch rollers being so arranged that said capstan is in contact with said pinch rollers at both its sides so that the tape may be clamped and driven between said capstan and said pinch rollers so that no tension is applied on said tape by said capstan and said pinch rollers.

2. The magnetic recording system for video signals according to claim 1 wherein the width of said first and second reels is made larger than that of said magnetic recording tape, wherein a guide mechanism for guiding said magnetic recording tape to said second reel is provided, and said guide mechanism is rotated in synchronism with said second reel to guide said tape across the width of said magnetic recording tape to form a layer of said tape at each predetermined number of revolutions of said second reel whereby to build up said layers on said second reel.

References Cited by the Examiner

UNITED STATES PATENTS

| | | | |
|---|---|---|---|
| 2,420,671 | 5/1947 | Little. | |
| 2,509,500 | 5/1950 | Howey | 242—54.1 |
| 2,525,995 | 10/1950 | Barbara et al. | 242—54.1 |
| 2,658,398 | 10/1953 | Masterson. | |
| 2,675,185 | 4/1954 | Zenner | 242—54.1 |
| 3,222,003 | 12/1965 | Guerth | 242—55.14 |

FOREIGN PATENTS

| | | |
|---|---|---|
| 1,036,478 | 4/1953 | France. |

FRANK J. COHEN, *Primary Examiner.*

GEORGE F. MAUTZ, *Examiner.*